(12) United States Patent
Borzooeian et al.

(10) Patent No.: US 11,167,247 B2
(45) Date of Patent: Nov. 9, 2021

(54) LENGTH-BASED SEPARATION OF CARBON NANOTUBES

(71) Applicant: NANOLC-12, LLC, Natick, MA (US)

(72) Inventors: Zahra Borzooeian, Brighton, MA (US); Mohammad E. Taslim, Needham, MA (US)

(73) Assignee: NANOLC-12, LLC, Natick, MA (US)

( * ) Notice: Subject to any disclaimer, the term of this patent is extended or adjusted under 35 U.S.C. 154(b) by 0 days.

(21) Appl. No.: 15/897,781

(22) Filed: Feb. 15, 2018

(65) Prior Publication Data
US 2018/0243692 A1    Aug. 30, 2018

Related U.S. Application Data

(60) Provisional application No. 62/459,152, filed on Feb. 15, 2017.

(51) Int. Cl.
   B01D 57/02     (2006.01)
   C01B 32/172    (2017.01)
   (Continued)

(52) U.S. Cl.
   CPC ............ B01D 57/02 (2013.01); C01B 32/172 (2017.08); *B82Y 30/00* (2013.01); *B82Y 40/00* (2013.01);
   (Continued)

(58) Field of Classification Search
   CPC ..................... Y10S 977/742; C01B 2202/34
   See application file for complete search history.

(56) References Cited

U.S. PATENT DOCUMENTS 4,555,490 A  * 11/1985  Merril ............. G01N 27/44726
                                                    436/169
5,316,908 A      5/1994  Carlson et al.
                 (Continued)

FOREIGN PATENT DOCUMENTS

WO       2008143281 A1    11/2008

OTHER PUBLICATIONS

Z. Borzooeian, Preparation and investigation on properties of lysozyme chemically bonded to single-walled carbon nanotubes, Journal of Experimental Nanoscience, 2010 (5), p. 536-47. (Year: 2010).*
(Continued)

*Primary Examiner* — Luan V Van
*Assistant Examiner* — Caitlyn Mingyun Sun
(74) *Attorney, Agent, or Firm* — Nelson Mullins Riley & Scarborough LLP; Reza Mollaaghababa; Thomas J. Engellenner (57) ABSTRACT

Disclosed are methods for separating carbon nanotubes on the basis of a specified parameter, such as length. The methods include labelling of the carbon nanotubes with a biological moiety, followed by SDS-PAGE and staining, to separate the carbon nanotubes on the basis of length and/or characterize their length. In some embodiments, egg-white lysozyme, conjugated covalently onto single-walled carbon nanotubes surfaces using carbodiimide method, followed by SDS-PAGE and visualization of the single-walled nanotubes using silver staining, provides high resolution characterization of length of the single-walled carbon nanotubes. This high precision, inexpensive, rapid and simple separation method obviates the need for centrifugation, additional chemical analyses, and expensive spectroscopic techniques such as Raman spectroscopy to visualize carbon nanotube bands. The disclosed methods find utility in quality-control in the manufacture of carbon nanotubes of specific lengths.

6 Claims, 6 Drawing Sheets

(51) Int. Cl.
  *B82Y 40/00* (2011.01)
  *B82Y 30/00* (2011.01)
(52) U.S. Cl.
  CPC ....... *C01B 2202/34* (2013.01); *Y10S 977/746* (2013.01); *Y10S 977/845* (2013.01); *Y10S 977/847* (2013.01)

(56) References Cited

U.S. PATENT DOCUMENTS

| | | | |
|---|---|---|---|
| 5,449,758 | A | 9/1995 | Hartley |
| 5,840,575 | A | 11/1998 | Hyman |
| 7,374,649 | B2 * | 5/2008 | Jagota .................... B82Y 10/00 204/456 |
| 10,060,910 | B2 | 8/2018 | Coleman et al. |
| 2004/0235016 | A1 * | 11/2004 | Hamers .................... B82Y 5/00 435/6.19 |
| 2006/0024808 | A1 | 2/2006 | Darzins et al. |
| 2006/0142148 | A1 | 6/2006 | Ma et al. |
| 2008/0076816 | A1 | 3/2008 | Bianco et al. |
| 2010/0189626 | A1 * | 7/2010 | Tanaka ................... B01D 57/02 423/439 |
| 2011/0108424 | A1 | 5/2011 | Puget et al. |
| 2012/0259098 | A1 | 10/2012 | Baker, Jr. et al. |
| 2012/0269721 | A1 | 10/2012 | Weng et al. |
| 2018/0148479 | A1 | 5/2018 | Lim et al. |
| 2019/0076075 | A1 | 3/2019 | Miller et al. |
| 2019/0317102 | A1 | 10/2019 | Borzooeian et al. |
| 2020/0031672 | A1 | 1/2020 | Nihey |
| 2020/0200706 | A1 | 6/2020 | Borzooeian et al. |

OTHER PUBLICATIONS

M. Usrey et al. Controlling the Electrophoretic Mobility of Single-Walled Carbon Nanotubes: A comparison of Theory and Experiment, 23, Langmuir, 2007, p. 7768-76. (Year: 2007).*
G. H. Du, Growth of Carbon Nanotubes by Pyrolysis of Thiophene, 111 Journal of Physical Chemistry, 2007, p. 14293-98. (Year: 2007).*
A. Vetcher, Fractionation of SENT/nucleic acid complexes by agarose gel electrophoresis, Nanotechnology 2006 (17), p. 4263-69. (Year: 2006).*
D. Pantarotto, Synthesis, Structural Characterization, and Immunological Properties of Carbon Nanotubes Functionalized with Peptides, J. Am. Chem. Soc. 2003(125), p. 6160-64. (Year: 2003).*
O. Kharissova, Dispersion of carbon nanotubes in water and non-aqueous solvents, RSC Adv. 2013(3), p. 24812-52. (Year: 2013).*
J. Brunelle, One-dimensional SDS-Polyacrylamide Gel Electrophoresis (1D SDS-PAGE), Methods in Enzymology, 2014(541), Chapter 12, p. 151-59. (Year: 2014).*
M. Chevallet, Silver staining of proteins in polyacrylamide gels, Nature Protocols, 2006(1), p. 1852-58. (Year: 2006).*
M. Usrey, Controlling the Electrophoretic Mobility of Single-Walled Carbon Nanotubes: A comparison of Theory and Experiment, Langmuir 2007(23), p. 7768-76. (Year: 2007).*
U.S. Appl. No. 16/383,552, filed Apr. 12, 2019, Borzooeian, et al.
U.S. Appl. No. 16/660,446, filed Oct. 22, 2019, Borzooeian, et al.
Asuri P, Bale SS, Pangule RC, Shah DA, Kane RS, Dordick JS. Structure, function, and stability of enzymes covalently attached to single-walled carbon nanotubes. Langmuir. 2007 ;23 (24): 12318-21.
Bachtold A, Hadley P, Nakanishi T, Dekker C. Logic circuits with carbon nanotube transistors. Science 2001;294(5545):1317-20.
Bandow S, Rao A, Williams K, Thess A, Smalley R, Eklund P. Purification of single-wall carbon nanotubes by microfiltration. The Journal of Physical Chemistry B. 1997;101(44):8839-42.
Baughman RH, Zakhidov AA, de Heer WA. Carbon nanotubes—the route toward applications. science. 2002;297(5582):787-92.
Blum H, Beier H, Gross HJ. Improved silver staining of plant proteins, RNA and DNA in polyacrylamide gels. Electrophoresis. 1987;8(2):93-9.

Bonard JM, Stora T, Salvetat JP, Maier F, Stockli T, Duschl C, et al. Purification and size—selection of carbon nanotubes. Advanced Materials. 1997;9(10):827-31.
Borzooeian et al., "A high precision length-based carbon nanotube ladder," published in RSC Adv. 2018, 8, 36049-36055 (2018).
Chen P, Wu X, Lin J, Tan K. High H2 uptake by alkali-doped carbon nanotubes under ambient pressure and moderate temperatures. Science. 1999;285(5424):91-3.
Cheng J, Cheng SH. Influence of carbon nanotube length on toxicity to zebrafish embryos. International journal of nanomedicine. 2012;7:3731-9.
Doleman JN, Dalton A, Curran S, Rubio A, Davey A, Drury A, et al. Phase separation of carbon nanotubes and turbostratic graphite using a functional organic polymer. Advanced materials. 2000;12(3):213-6.
Dillon AC, Gennett T, Jones KM, Alleman JL, Parilla PA, Heben MJ. A simple and complete purification of single-walled carbon nanotube materials. Advanced Materials. 1999;11(16):1354-8.
Ding Z, Chen J, Gao S, Chang J, Zhang J, Kang E. Immobilization of chitosan onto poly-L-lactic acid film surface by plasma graft polymerization to control the morphology of fibroblast and liver cells. Biomaterials. 2004;25(6):1059-67.
Dong A, Caughey B, Caughey WS, Bhat KS, Coe JE. Secondary structure of the pentraxin female protein in water determined by infrared spectroscopy: Effects of calcium and phosphorylcholine. Biochemistry 1992;31(39):9364-70.
Dong A, Huang P, Caughey WS. Redox-dependent changes in. beta.-extended chain and turn structures of cytochrome c in water solution determined by second derivative amide I infrared spectra. Biochemistry. 1992;31(1):182-9.
Doorn SK, Fields RE, Hu H, Hamon MA, Haddon RC, Selegue JP, et al. High resolution capillary electrophoresis of carbon nanotubes. Journal of the American Chemical Society 2002;124(12):3169-74.
Doorn SK, Strano MS, O'Connell MJ, Haroz EH, Rialon KL, Hauge RH, et al. Capillary electrophoresis separations of bundled and individual carbon nanotubes. The Journal of Physical Chemistry B. 2003;107(25):6063-9.
Duesberg G, Blau W, Byrne H, Muster J, Burghard M, Roth S. Chromatography of carbon nanotubes. Synthetic Metals. 1999;103(1):2484-5.
Duesberg G, Muster J, Krstic V, Burghard M, Roth S. Chromatographic size separation of single-wall carbon nanotubes. Applied Physics A: Materials Science & Processing. 1998;67(1):117-9.
Franklin AD, Chen Z. Length scaling of carbon nanotube transistors. Nature nanotechnology. 2010;5(12):858-62.
Goux—Capes L, Filoramo A, Cote D, Bourgoin JP, Patillon JN. Coupling carbon nanotubes through DNA linker using a biological recognition complex. physica status solidi (a). 2006 ;203 (6): 1132-6.
He H, Pham-Huy LA, Dramou P, Xiao D, Zuo P, Pham-Huy C. Carbon nanotubes: applications in pharmacy and medicine. BioMed research international. 2013;2013, 1-12.
Heller DA, Mayrhofer RM, Baik S, Grinkova YV, Usrey ML, Strano MS. Concomitant length and diameter separation of single-walled carbon nanotubes. Journal of the American Chemical Society. 2004;126(44):14567-73.
Holzinger M, Hirsch A, Bernier P, Duesberg G, Burghard M. A new purification method for single-wall carbon nanotubes (SWNTs). Applied Physics A. 2000;70(5):599-602.
Huang W, Taylor S, Fu K, Lin Y, Zhang D, Hanks TW, et al. Attaching proteins to carbon nanotubes via diimide-activated amidation. Nano Letters. 2002;2(4):311-4.
A. C. Dillon, Jones A, Bekkedahl T, Kiang C. Storage of hydrogen in single-walled carbon nanotubes. Nature. 1997;386:377-9.
Kong J, Franklin NR, Zhou C, Chapline MG, Peng S, Cho K, et al. Nanotube molecular wires as chemical sensors. science. 2000;287(5453):622-5.
Li F, Cheng H, Xing Y, Tan P, Su G. Purification of single-walled carbon nanotubes synthesized by the catalytic decomposition of hydrocarbons. Carbon. 2000;38(14):2041-5.
Liu C, Fan Y, Liu M, Cong H, Cheng H, Dresselhaus MS. Hydrogen storage in single-walled carbon nanotubes at room temperature. Science. 1999;286(5442): 1127-9.

(56) References Cited

OTHER PUBLICATIONS

Liu J, Rinzler AG, Dai H, Hafner JH, Bradley RK, Boul PJ, et al. Fullerene pipes. Science. 1998;280(5367):1253-6.

Niyogi S, Hu H, Hamon M, Bhowmik P, Zhao B, Rozenzhak S, et al. Chromatographic purification of soluble single-walled carbon nanotubes (s-SWNTs). Journal of the American Chemical Society. 2001;123(4):733-4.

Raffaini G, Ganazzoli F. Protein adsorption on biomaterial and nanomaterial surfaces: a molecular modeling approach to study non-covalent interactions. Journal of Applied Biomaterial and Biomechanics. 2010;8(3):135-45.

Sayes CM, Liang F, Hudson JL, Mendez J, Guo W, Beach JM, et al. Functionalization density dependence of single-walled carbon nanotubes cytotoxicity in vitro. Toxicology letters. 2006;161(2):135-42.

Silverstein et al., Spectrometric identification of organic compounds, 546 Journal of Chemical Education, vol. 39, No. 11, Nov. 1962, 546-553.

Singh B, Saini K, Choudhary V, Teotia S, Pande S, Saini P, et al. Effect of length of carbon nanotubes on electromagnetic interference shielding and mechanical properties of their reinforced epoxy composites. Journal of nanoparticle research. 2014;16(1):1-11.

Tohji K, Takahashi H, Shinoda Y, Shimizu N, Jeyadevan B, Matsuoka I, et al. Purification procedure for single-walled nanotubes. The Journal of Physical Chemistry B. 1997;101(11):1974-8.

Vetcher AA, Srinivasan S, Vetcher IA, Abramov SM, Kozlov M, Baughman RH, et al. Fractionation of SWNT/nucleic acid complexes by agarose gel electrophoresis. Nanotechnology. 2006;17(16):4263-9.

Wang et al., "Fabrication of Ultralong and Electrically Uniform Single-Walled Carbon Nanotubes on Clean Substrates", Nano Letter, vol. 9, No. 9, 2 pages (2009).

Wang X, Jiang Q, Xu W, Cai W, Inoue Y, Zhu Y. Effect of carbon nanotube length on thermal, electrical and mechanical properties of CNT/bismaleimide composites. Carbon. 2013;53:145-52.

Yamamoto K, Akita S, Nakayama Y. Orientation and purification of carbon nanotubes using ac electrophoresis. Journal of physics D: Applied physics. 1998;31(8):L34 6.

Yao Z, Postma HWC, Balents L, Dekker C. Carbon nanotube intramolecular junctions. Nature. 1999;402(6759):273-6.

Yudasaka M, Zhang M, Jabs C, Iijima S. Effect of an organic polymer in purification and cutting of single-wall carbon nanotubes. Applied Physics A. 2000;71(4):449-51.

Z. Borzooeian Met, G. Borzooeian, O. Ghasemi, M. Aminlari. Activity and Stability Analysis of Covalent Conjugated Lysozyme-single walled carbon nanotubes: Potential Biomedical and Industrial Applications. RSC Adv., 2017, 7, 48692-48701.

Ziegler KJ, Rauwald U, Gu Z, Liang F, Billups W, Hauge RH, et al. Statistically accurate length measurements of single-walled carbon nanotubes. Journal of nanoscience and nanotechnology. 2007;7(8):pp. 1-5.

* cited by examiner

LENGTH-BASED SEPARATION OF CARBON NANOTUBES

RELATED APPLICATIONS

This application claims the benefit of U.S. Provisional Patent Application No. 62/459,152, filed on Feb. 15, 2017.

BACKGROUND

Various techniques of synthesizing carbon nanotubes (CNTs) produce nanotubes with different lengths, diameters, and structures. In typical applications, when nanotubes are used, e.g., conductive and high-strength composites, nanometer-sized semiconductor devices, probes and interconnects [1], sensors [2], energy storage and energy conversion devices, hydrogen storage [3-5], nanotube transistors [6, 7], and nanomedicine [8], structural parameters can have a considerable impact on the properties, (e.g., reactivity) of carbon nanotubes.

Any new technique that intended to separate and purify nanotubes in a scalable, reproducible, and simple manner should measure certain morphological parameters (e.g., diameter and length) of CNTs. Length of nanotubes have been demonstrated to have a positive correlation with thermal and electrical activities, that is, longer multi-wall carbon nanotubes (MWCNTs) typically afford higher thermal and electrical conductivities [9]. In addition, length of nanotubes can impact transistors performance [10], electromagnetic interference shielding, and mechanical properties of CNT-based epoxy composites [11].

Length of nanotubes can also have a significant effect on biological response, human health and the environment. There is a growing consensus that characterization of nanotubes is an important step in assessing the potential toxicity of nanomaterials in biological systems [12]. For example, Cheng [13], in a study on the influence of carbon nanotube length on toxicity of zebra fish embryos, showed that length plays an important role in the in vivo toxicity of functionalized CNTs. One study on single-walled carbon nanotubes (SWCNTs) cytotoxicity demonstrated that the cytotoxic response of cells in a culture is dependent on the degree of functionalization [14], which in turn depends on the length of CNTs. Therefore, length control, and measurement to effect length control, is important to manage and reduce the toxicity of CNTs and leverage the green chemistry potential of CNTs.

Accordingly, length-based separation and length measurement of CNTs after synthesis has attracted particular attention. However, measuring basic parameters, e.g., diameter and length of CNTs, remains an ongoing challenge to the nanotechnology researchers and in CNT commercial scale production. Some purification and size-selection techniques include solvent (e.g., $CS_2$, toluene) treatment of nanotubes followed by ultrafiltration [15, 16], floculation using aqueous surfactants [17], oxidation and acid washing coupled with centrifugation, resuspension in surfactant solution, and cross-flow filtration steps [18, 19], polymer suspensions [20, 21], chromatographic purification [22, 23], field-flow fractionation on purified shortened nanotubes [24], and size-exclusion chromatography on raw nanotubes suspended in sodium dodecyl sulfate (SDS) [25, 26].

In addition, electrophoretic methods can enable nanomaterials purification [27-29] and characterization [30, 31] and separation based on parameters such as size, shape, length, and diameter [27, 31]. For diameter-, length-, and curvature-based separation of CNTS, electrophoresis techniques such as AC electrophoresis in isopropyl alcohol to purify MWCNTs [29], capillary electrophoresis to separate SDS-coated SWCNTs [27], and agarose gel electrophoresis to fractionate SWCNT/nucleic acid complexes [32] have been demonstrated. Capillary electrophoresis has also been employed to detect the complexity of DNA-suspended SWCNTs via streptavidin/biotin binding [33]. Finally, some efforts have focused on length-based separation of CNTs using gel permeation chromatography column and an inhomogeneous magnetic field.

Nanotubes can be produced in a wide range of lengths, diameters, and structures. Much research has focused on accurately measuring the structure-based parameters of nanotubes because some of their properties are dependent on these structural parameters. Therefore, length-based separation can be an important tool for advancing nanotube science. In CNTs synthesis processes, accurate measurement of nanotubes length is important to understand the nanotube growth and cutting processes [39]. Franklin and his colleagues provided the first experimental evidence of the effects of contact length in nanotube transistors by fabricating sets of devices with different nanotube lengths [10]. Moreover, the length-based separation of CNTs is considered a key step enabling their applications in biologically relevant settings such as drug delivery.

Since 1998, there have been more than 200 papers on the separation of SWNTs based on their conductivity, diameter, handedness, and length in the literature. Several chromatographic methods have been reported for length-based separation of CNT's by Duesberg [25, 44, 45] using size-exclusion chromatography (SEC), Rinzler [46] using high performance liquid chromatography (HPLC) and Fotios Papadimitrakopolous's group[47] using gel permeation chromatography. Using chromatography to effect carbon nanotube separation, however, it is difficult to predict the precise time that any given carbon nanotube will exit the chromatography column due to the stochastic nature of the particle-pore interactions. Thus, chromatographic separation processes are not known as capable methods for extracting carbon nanotubes of specific lengths.

Besides centrifugation[48], length-based separation of carbon nanotubes by their electrical properties is more commonly performed using capillary electrophoresis(CE) and agarose gel electrophoresis[31, 32]. However, there exist no electrophoretic methods for precise and rapid length-based separation of CNTs.

The aforementioned methods which have poor precision and scalability, used the UV/vis spectroscopic, AFM, and Raman Spectroscopy. These techniques can be complex and expensive. Despite all the reported separation techniques, there exists no preparative electrophoretic methods for precise, rapid, simple and cost-effective length-based separation of CNTs. Thus, a need exists for precise, rapid, and simple and cost-effective length-based separation and characterization of CNTs.

SUMMARY OF THE DISCLOSURE

In other aspects, the present disclosure relates to methods for determining the average length of a sample of labelled carbon nanotubes, comprising: labelling each of a plurality of carbon nanotubes with a biological moiety, to provide labelled carbon nanotubes; subjecting the labelled carbon nanotubes to gel electrophoresis, to provide a electrophoresis gel comprising the labelled carbon nanotubes; treating the electrophoresis gel comprising the labelled carbon nanotubes with a visualizing agent to provide stained, labelled carbon nanotubes; and measuring, at a plurality of locations in the electrophoresis gel, the visual intensity of the stained, labelled carbon nanotubes; wherein the average length of the stained, labelled carbon nanotubes is a function of their distance travelled in the electrophoresis gel.

In some aspects, the present disclosure relates to methods for separating carbon nanotubes, comprising labelling each of a plurality of carbon nanotubes with a biological moiety, to provide labelled carbon nanotubes; subjecting the labelled carbon nanotubes to gel electrophoresis, to provide a electrophoresis gel comprising the labelled carbon nanotubes; treating the electrophoresis gel comprising the labelled carbon nanotubes with a visualizing agent to provide stained, labelled carbon nanotubes; removing one or more portions of the electrophoresis gel comprising stained, labelled carbon nanotubes having a value or a range of a target parameter; and isolating the stained, labelled carbon nanotubes from the one or more portions of the electrophoresis gel, thereby providing separated carbon nanotubes. In certain embodiments, the method further comprises measuring the average length of the stained, labelled carbon nanotubes by UV/vis spectroscopy, AFM, or Raman Spectroscopy.

DETAILED DESCRIPTION

Methods for Separating Carbon Nanotubes

In certain aspects, the present disclosure provides methods for separating carbon nanotubes. The methods can include: labelling each of a plurality of carbon nanotubes with a biological moiety, to provide labelled carbon nanotubes; subjecting the labelled carbon nanotubes to gel electrophoresis, to provide a electrophoresis gel comprising the labelled carbon nanotubes; treating the electrophoresis gel comprising the labelled carbon nanotubes with a visualizing agent to provide stained, labelled carbon nanotubes; removing one or more portions of the electrophoresis gel comprising stained, labelled carbon nanotubes having a value or a range of a target parameter; and isolating the stained, labelled carbon nanotubes from the one or more portions of the electrophoresis gel, thereby providing separated carbon nanotubes. In certain embodiments, the method further comprises measuring the average length of the stained, labelled carbon nanotubes by UV/vis spectroscopy, AFM, or Raman Spectroscopy.

In some embodiments, the nanotubes can be any commercially or laboratory-prepared nanotubes. For example, the nanotubes can be carbon nanotubes. However, in some embodiments, the present methods can be applied to other nanomaterials such as nanotubes, nanoparticles, etc. In some embodiments, the carbon nanotubes are single-walled carbon nanotubes. In other embodiments the carbon nanotubes are double-walled carbon nanotubes. In still other embodiments, the carbon nanotubes are multi-walled carbon nanotubes (e.g., three-walled, quadruple-walled, quintuple-walled). As used hereinafter, unless otherwise specified, "carbon nanotubes" is intended to refer to a population of any one of single-walled, double-walled carbon nanotubes, or multi-walled carbon nanotubes, or mixtures thereof.

In certain embodiments of the present methods, the carbon nanotubes to be separated are labelled with a biological moiety. For example, in some embodiments, the carbon nanotubes can be labelled with a protein. The protein can be any soluble, structural, linear or globular protein suitable for use in the present methods. For example, readily available proteins include those isolated from milk or other biological system. Alternatively, the protein can be prepared or isolated from any protein source. In certain embodiments, the protein can be an enzyme, a protein domain, a bioactive peptide, an antibody or a hormone. In some embodiments, the protein can be any soluble, structural, linear or globular protein.

In some embodiments, the enzyme is an oxidoreductase. In other embodiments, the enzyme is a transferase. In certain embodiments, the enzyme is a hydrolase. In some embodiments, the enzyme is an isomerase. In certain embodiments, the enzyme is a ligase. In some embodiments, the enzyme is a lyase. In some embodiments, the enzyme can be egg white lysozyme. In other embodiments, the biological moiety can be a peptide or peptide fragment. Suitable peptides can include any peptide fragment of chain comprising from 2-10, 2-100, 2-1,000 or more amino acid residues. The amino acid residues can be natural or unnatural amino acids or derivatives thereof. In some embodiments, the biological label can comprise chicken egg white lysozyme.

In some embodiments, the peptide can be an antimicrobial peptide, a Tachykinin peptide, a vasoactive intestinal peptide, a pancreatic polypeptide-related peptide, an opioid peptide, a calcitonin peptide, or other peptide such as a B-type natriuretic peptide (BNP), a lactotripeptides, or a peptidic component from traditional Chinese medicine Colla Coni Asini in hematopoiesis. In some embodiments, the carbon nanotubes can be labelled with a protein domain. In some embodiments, the carbon nanotubes can be labelled with a bioactive peptide. In some embodiments, the protein is an antibody. In some embodiments, the protein is a hormone. Hormones that occur in multicellular organisms (plants, animals, fungi, brown algae and red algae) or occur in unicellular organisms can be employed.

In one aspect, the present methods can include labelling the carbon nanotubes with the biological moiety. Labelling can comprise reacting the carbon nanotubes and the biological moiety with a linking reagent to provide the labelled carbon nanotubes. In some embodiments, the linking reagent can react with functional groups on the surface of the carbon nanotubes. In other embodiments, the linking reagent can react with functional groups of the biological moiety. For example, proteins, peptides and enzymes typically comprise amino acid residues which can comprise functional groups including alcohols, thioethers, carboxylic acids, carboxamides, amines, amides, thiols. In some embodiments, the linking reagent reacts with a functional group of the biological moiety. In some embodiments, the linking reagent is a peptide-forming reagent.

In some embodiments, the linking reagent covalently links the carbon nanotubes and the biological moiety. In other embodiments, the biological moiety and the carbon nanotubes can be non-covalently linked. Such non-covalent linking can be effected by combining a biological moiety with affinity for the carbon nanotubes. Such linking can be effected via hydrogen bonding interactions between the surface of the carbon nanotubes and the biological moiety. In other embodiments, such non-covalent linking is the result of Van der Waals interactions between the carbon nanotubes and the biological moiety. In certain embodiments, the non-covalent linking is the result of hydrogen bonding interactions, electrostatic interactions, π-π interactions, or hydrophobic effects.

In certain embodiments, the linking agent is a peptide coupling agent. In certain embodiments, the linking agent is a carbodiimide reagent. Such carbodiimide reagents can form amide bonds, also referred to as peptide bonds, between the biological moiety and the carbon nanotubes. In some embodiments, the carbodiimide reagent is N-ethyl-N'-(3-(dimethylamino)propyl)carbodiimide. In other embodiments, the linking reagent can be dicyclohexylcarbodiimide. In certain embodiments, the linking reagent can be diisopropylcarbodiimide. However, any peptide coupling agent links the carbon nanotubes an the biological moiety can be employed. In some embodiments, the linking agent is a carbodiimide reagent, a polymer phospholipid-polyethylene glycol (PL-PEG-NH2), a polystyrene-block-polyacrylic acid (PS-b-PAA), an imidazolium salt based ionic liquid (IS-IL), or an ethylenediamine. In another aspect, the present methods include separating the labelled carbon nanotubes. Thus, in some embodiments the labelled carbon nanotubes are loaded into a gel and separated via electrophoresis. Gel electrophoresis is a technique known in the art employed to separate macromolecules such as DNA, RNA, proteins or other biological moieties. Thus, the present methods advantageously employ the properties of biological moieties and high resolving power of gel electrophoresis for biological moieties to separate the labelled carbon nanotubes. In some embodiments, electrophoresis comprises sodium dodecyl sulfate polyacrylamide gel electrophoresis (SDS-PAGE). In other embodiments, the gel is agarose. In certain embodiments, the gel is a starch gel. In some embodiments, the electrophoresis is conducted in denaturing conditions. In other embodiments, electrophoresis is conducted in non-denaturing conditions. In certain embodiments, the electrophoresis process is run at a constant electric field. In other embodiments, the electrophoresis process can be run with a pulsed field, a gradient field, or an inverted field.

After the labelled carbon nanotubes are separated in the electrophoresis gel, they can be stained to provide stained, labelled carbon nanotubes. Such staining visualizes the bands or separated populations of the carbon nanotubes in the gel. Any staining agent that visualizes the labelled carbon nanotubes can be employed. For example, in some embodiments, ethidium bromide can be employed to satin the labelled nanotubes. In other embodiments, coomassie blue can be employed to provide stained, labelled carbon nanotubes. In certain embodiments, the visualizing agent comprises silver nitrate or silver-ammonia complex solution. Staining can be effected by contacting the gel comprising the separated, labelled carbon nanotubes with the staining agent.

In another aspect, the present methods can effect separation based on a target parameter value or range of the labelled carbon nanotubes. The target parameter can be length, shape, diameter, or number of walls present in the carbon nanotubes. Thus, in some embodiments, the labelled carbon nanotubes are separated by length. In other embodiments, the labelled carbon nanotubes are separated by shape. To characterize the value or the range of the target parameter, the visual intensity of the stained, labelled carbon nanotubes can be determined in the one or more portions of the electrophoresis gel. In certain embodiments, the parameter is length, and the determination comprises calculating the length of the stained, labelled carbon nanotubes based on the following formula:

$$L = d\exp\left[\frac{3\pi\eta\mu}{q(d)e} - 2\ln 2 + 1\right]$$

wherein L is the calculated length, d is mean diameter, η is the solvent viscosity, q(d) is persistence length, e is the electron charge and μ is the electrophoretic mobility (Usrey's equation, Usrey et al., 2007 [34]). Without wishing to be bound to any particular theory, the visual intensity of the populations of the stained, labelled carbon nanotubes in the gel can be correlated to their length via the formula above.

In some embodiments, the carbon nanotubes to be separated according to the present methods have a length of about 10 nm to about 1 cm. For example, in certain embodiments, the carbon nanotubes have a length of about 10 nm to about 10 μm, about 1 μm to about 100 μm, about 1 μm to about 1 mm, about 100 μm to about 1 mm, about 100 μm to about 1 cm, or about 1 mm to about 1 cm, or any other value or range of values therein. In some embodiments, the resolution of separation effected by the present methods can be about 1 nm, about 10 nm, about 100 nm, about 1 μm, about 10 μm, about 100 μm, or any other value or range of values therein.

In some embodiments, the carbon nanotubes to be separated according to the present methods have diameter of about 0.5 nm to about 100 nm. For example, in certain embodiments, the carbon nanotubes have a diameter of about 0.5 nm, about 1 nm, about 5 nm, about 10 nm, about 20 nm, about 30 nm, about 40 nm, about 50 nm, about 60 nm, about 70 nm, about 80 nm, about 90 nm, about 100 nm, or any other value or range of values therein.

In some embodiments, the carbon nanotubes are surface functionalized carbon nanotubes. Any surface functionalization compatible with the present methods can be employed. In some embodiments, the surface of the carbon nanotubes are functionalized with a carboxylic acid moiety. In some embodiments, the carboxylic acid is a carboxylate salt. Suitable counterions can include any cation which does not interfere with the electrophoresis process. For example, in some embodiments, the counterion can be an alkali metal. In certain embodiments, the alkali metal can be lithium, sodium or potassium. In other embodiments, the surface functionalized carbon nanotubes are amine, amide or thiol (—$NH_2$, —(CO)$NH_2$, —CONHCH$_2$CH$_2$SH) functionalized carbon nanotubes. The amine can be present as a free base, or as an amine salt. Suitable counterions can include any anion which does not interfere with the electrophoresis process. Thus, in some embodiments, the counterion can be a halogen ion. In certain embodiments, the halogen ion can be F, Cl, Br, or I. In other embodiments, the carbon nanotubes are —(CO)$NH_2$ or —CONHCH$_2$CH$_2$SH functionalized carbon nanotubes.

In another aspect, the present methods can include subjecting the labelled carbon nanotubes to gel electrophoresis which separates the labelled carbon nanotubes into groups of labelled carbon nanotubes. In some embodiments, the labelled carbon nanotubes in the groups of labelled carbon nanotubes have a substantially similar length. In some embodiments, the length labeled nanotubes in the group can vary +/−10% of the average length of the group of labelled carbon nanotubes. In other embodiments, the length of the labeled carbon nanotubes in the group can vary +/−10%, +/−9%, +/−8%, +/−7%, +/−6%, +/−5%, +/−4%, +/−3%, +/−2%, +/−1%, +/−0.9%, +/−0.8%, +/−0.7%, +/−0.6%, +/−0.5%, +/−0.4%, +/−0.3%, +/−0.2%, +/−0.1%, +/−0.09%, +/−0.08%, +/−0.07%, +/−0.06%, +/−0.05%, +/−0.04%, +/−0.03%, +/−0.02%, or +/−0.01%, of the average length of the group of labelled carbon nanotubes, or any other range of values therein.

In some embodiments, the present methods can also include measuring the average length of the isolated, stained, labelled carbon nanotubes. In certain embodiments, average length can be measured by employing one or more of UV-vis spectroscopy, atomic force microscopy (AFM), and Raman spectroscopy.

Methods for Determining the Length of Carbon Nanotubes

In still another aspect, the present disclosure provides a method for determining the average length of a sample of labelled carbon nanotubes, comprising: labelling each of a plurality of carbon nanotubes with a biological moiety, to provide labelled carbon nanotubes; subjecting the labelled carbon nanotubes to gel electrophoresis, to provide a electrophoresis gel comprising the labelled carbon nanotubes; treating the electrophoresis gel comprising the labelled carbon nanotubes with a visualizing agent to provide stained, labelled carbon nanotubes; and measuring, at a plurality of locations in the electrophoresis gel, the visual intensity of the stained, labelled carbon nanotubes; wherein the average length of the stained, labelled carbon nanotubes is a function of their distance travelled in the electrophoresis gel.

In some embodiments, the nanotubes can be any commercially or laboratory-prepared nanotubes. For example, the nanotubes can be carbon nanotubes. However, in some embodiments, the present methods can be applied to other nanomaterials such as nanotubes, nanoparticles, etc. In some embodiments, the carbon nanotubes are single-walled carbon nanotubes. In other embodiments the carbon nanotubes are double-walled carbon nanotubes. In still other embodiments, the carbon nanotubes are multi-walled carbon nanotubes (e.g., three-walled, quadruple-walled, quintuple-walled). As used hereinafter, unless otherwise specified, "carbon nanotubes" is intended to refer to a population of any one of single-walled, double-walled carbon nanotubes, or multi-walled carbon nanotubes, or mixtures thereof.

In certain embodiments of the present methods, the carbon nanotubes to be separated are labelled with a biological moiety. For example, in some embodiments, the carbon nanotubes can be labelled with a protein. The protein can be any soluble, structural, linear or globular protein suitable for use in the present methods. For example, readily available proteins include those isolated from milk or other biological system. Alternatively, the protein can be prepared or isolated from any protein source. In certain embodiments, the protein can be an enzyme, a protein domain, a bioactive peptide, an antibody or a hormone. In some embodiments, the protein can be any soluble, structural, linear or globular protein.

In some embodiments, the enzyme is an oxidoreductase. In other embodiments, the enzyme is a transferase. In certain embodiments, the enzyme is a hydrolase. In some embodiments, the enzyme is an isomerase. In certain embodiments, the enzyme is a ligase. In some embodiments, the enzyme is a lyase. In some embodiments, the enzyme can be egg white lysozyme. In other embodiments, the biological moiety can be a peptide or peptide fragment. Suitable peptides can include any peptide fragment of chain comprising from 2-10, 2-100, 2-1,000 or more amino acid residues. The amino acid residues can be natural or unnatural amino acids or derivatives. In some embodiments, the biological label can comprise chicken egg white lysozyme.

In some embodiments, the peptide can be an antimicrobial peptide, a Tachykinin peptide, a vasoactive intestinal peptide, a pancreatic polypeptide-related peptide, an opioid peptide, a calcitonin peptide, or other peptide such as a B-type natriuretic peptide (BNP), a lactotripeptides, or a peptidic component from traditional Chinese medicine Colla Corii Asini in hematopoiesis. In some embodiments, the carbon nanotubes can be labelled with a protein domain. In some embodiments, the carbon nanotubes can be labelled with a bioactive peptide. In some embodiments, the protein is an antibody. In some embodiments, the protein is a hormone. Hormones which occur in multicellular organisms (plants, animals, fungi, brown algae and red algae) or occur in unicellular organisms can be employed.

In one aspect, the present methods can include labelling the carbon nanotubes with the biological moiety. Labelling can comprise reacting the carbon nanotubes and the biological moiety with a linking reagent to provide the labelled carbon nanotubes. In some embodiments, the linking reagent can react with functional groups on the surface of the carbon nanotubes. In other embodiments, the linking reagent can react with functional groups of the biological moiety. For example, proteins, peptides and enzymes typically comprise amino acid residues which can comprise functional groups including alcohols, thioethers, carboxylic acids, carboxamides, amines, amides, thiols. In some embodiments, the linking reagent reacts with a functional group of the biological moiety. In some embodiments, the linking reagent is a peptide-forming reagent.

In some embodiments, the linking reagent covalently links the carbon nanotubes and the biological moiety. In other embodiments, the biological moiety and the carbon nanotubes can be non-covalently linked. Such non-covalent linking can be effected by combining a biological moiety with affinity for the carbon nanotubes. Such linking can be effected via hydrogen bonding interactions between the surface of the carbon nanotubes and the biological moiety. In other embodiments, such non-covalent linking is the result of Van der Waals interactions between the carbon nanotubes and the biological moiety. In certain embodiments, the non-covalent linking is the result of hydrogen bonding interactions, electrostatic interactions, π-π interactions, or hydrophobic effects.

In certain embodiments, the linking agent is a peptide coupling agent. In certain embodiments, the linking agent is a carbodiimide reagent. Such carbodiimide reagents can form amide bonds, also referred to as peptide bonds, between the biological moiety and the carbon nanotubes. In some embodiments, the carbodiimide reagent is N-ethyl-N'-(3-(dimethylamino)propyl)carbodiimide. In other embodiments, the linking reagent can be dicyclohexylcarbodiimide. In certain embodiments, the linking reagent can be diisopropylcarbodiimide. However, any peptide coupling agent links the carbon nanotubes an the biological moiety can be employed. In some embodiments, the linking agent is a carbodiimide reagent, a polymer phospholipid-polyethylene glycol (PL-PEG-NH2), a polystyrene-block-polyacrylic acid (PS-b-PAA), an imidazolium salt based ionic liquid (IS-IL), or an ethylenediamine.

In another aspect, the present methods include separating the labelled carbon nanotubes to determine their length. Thus, in some embodiments the labelled carbon nanotubes are loaded into a gel and separated via electrophoresis. Gel electrophoresis is a technique known in the art employed to separate macromolecules such as DNA, RNA, proteins or other biological moieties. Thus, the present methods advantageously employ the properties of biological moieties and high resolving power of gel electrophoresis for biological moieties to separate the labelled carbon nanotubes. In some embodiments, electrophoresis comprises sodium dodecyl sulfate polyacrylamide gel electrophoresis (SDS-PAGE). In other embodiments, the gel is agarose. In certain embodiments, the gel is a starch gel. In some embodiments, the electrophoresis is conducted in denaturing conditions. In other embodiments, electrophoresis is conducted in non-denaturing conditions. In certain embodiments, the electrophoresis process is run at a constant electric field. In other embodiments, the electrophoresis process can be run with a pulsed field, a gradient field, or an inverted field.

After the labelled carbon nanotubes are separated in the electrophoresis gel, they can be stained to provide stained, labelled carbon nanotubes. Such staining visualizes the bands or separated populations of the carbon nanotubes in the gel. Any staining agent that visualizes the labelled carbon nanotubes can be employed. For example, in some embodiments, ethidium bromide can be employed to stain the labelled carbon nanotubes. In other embodiments, coomassie blue can be employed to provide stained, labelled carbon nanotubes. In certain embodiments, the visualizing agent comprises silver nitrate or silver-ammonia complex solution. Staining can be effected by contacting the gel comprising the separated, labelled carbon nanotubes in the gel with the staining agent.

In another aspect, the present methods can effect separation of labeled carbon nanotubes to determine the length of the carbon nanotubes. However, separation to determine other parameters is contemplated. For example, the target parameter can be length, shape, diameter, or number of walls present in the carbon nanotubes. Thus, in some embodiments, the labelled carbon nanotubes are separated by length. In other embodiments, the labelled carbon nanotubes are separated by shape. To measure the value or the range of the target parameter, the visual intensity of the stained, labelled carbon nanotubes can be determined in the one or more portions of the electrophoresis gel. In certain embodiments, the parameter is length, and the determination comprises calculating the length of the stained, labelled carbon nanotubes based on the following formula:

$$L = d\exp\left[\frac{3\pi\eta\mu}{q(d)e} - 2\ln 2 + 1\right]$$

wherein L is the calculated length, d is mean diameter, $\eta$ is the solvent viscosity, q(d) is persistence length, e is the electron charge and $\mu$ is the electrophoretic mobility. Without wishing to be bound to any particular theory, the visual intensity of the populations of the stained, labelled carbon nanotubes in the gel can be correlated to their length via the formula above.

In some embodiments, the carbon nanotubes to be separated according to the present methods have a length of about 10 nm to about 1 cm. For example, in certain embodiments, the carbon nanotubes have a length of about 10 nm to about 10 μm, about 1 μm to about 100 μm, about 1 μm to about 1 mm, about 100 μm to about 1 mm, about 100 μm to about 1 cm, or about 1 mm to about 1 cm, or any other value or range of values therein. In some embodiments, the resolution of separation effected by the present methods can be about 1 nm, about 10 nm, about 100 nm, about 1 μm, about 10 μm, about 100 μm, or any other value or range of values therein.

In some embodiments, the carbon nanotubes to be separated according to the present methods have diameter of about 0.5 nm to about 100 nm. For example, in certain embodiments, the carbon nanotubes have a diameter of about 0.5 nm, about 1 nm, about 5 nm, about 10 nm, about 20 nm, about 30 nm, about 40 nm, about 50 nm, about 60 nm, about 70 nm, about 80 nm, about 90 nm, about 100 nm, or any other value or range of values therein.

In some embodiments, the carbon nanotubes are surface functionalized carbon nanotubes. Any surface functionalization compatible with the present methods can be employed. In some embodiments, the surface of the carbon nanotubes are functionalized with a carboxylic acid moiety. In some embodiments, the carboxylic acid is a carboxylate salt. Suitable counterions can include any cation which does not interfere with the electrophoresis process. For example, in some embodiments, the counterion can be an alkali metal. In certain embodiments, the alkali metal can be lithium, sodium or potassium. In other embodiments, the surface functionalized carbon nanotubes are amine, amide or thiol (—$NH_2$, —(CO)$NH_2$, —CONH$CH_2CH_2$SH) functionalized carbon nanotubes. The amine can be present as a free base, or as an amine salt. Suitable counterions can include any anion which does not interfere with the electrophoresis process. Thus, in some embodiments, the counterion can be a halogen ion. In certain embodiments, the halogen ion can be F, Cl, Br, or I. In other embodiments, the carbon nanotubes are —(CO)$NH_2$ or —CONH$CH_2CH_2$SH functionalized carbon nanotubes.

In another aspect, the present methods can include subjecting the labelled carbon nanotubes to gel electrophoresis which separates the labelled carbon nanotubes into groups of labelled carbon nanotubes. In some embodiments, the labelled carbon nanotubes in the groups of labelled carbon nanotubes have a substantially similar length. In some embodiments, the length labeled nanotubes in the group can vary +/−10% of the average length of the group of labelled carbon nanotubes. In other embodiments, the length labeled nanotubes in the group can vary +/−10%, +/−9%, +/−8%, +/−7%, +/−6%, +/−5%, +/−4%, +/−3%, +/−2%, +/−1%, +/−0.9%, +/−0.8%, +/−0.7%, +/−0.6%, +/−0.5%, +/−0.4%, +/−0.3%, +/−0.2%, +/−0.1%, +/−0.09%, +/−0.08%, +/−0.07%, +/−0.06%, +/−0.05%, +/−0.04%, +/−0.03%, +/−0.02%, or +/−0.01%, of the average length of the group of labelled carbon nanotubes, or any other range of values therein.

Results from XRD patterns (FIGS. 1A, 1B and 1C), FTIR (FIG. 2), and SEM micrographs (FIGS. 3A, 3B and 3C) demonstrate that biological moiety (e.g., lysozyme) can disposed onto the SWCNTs surface during conjugation. Thus, in some embodiments, the biological moiety is linked to at least about 1% of the free functional groups on the surface of the carbon nanotubes. In certain embodiments, the biological moiety is linked to at least about 2%, at least about 3%, at least about 4%, at least about 5%, at least about 10%, at least about 20%, at least about 30%, at least about 40%, at least about 50%, at least about 60%, at least about 65%, at least about 70%, at least about 75%, at least about 80%, at least about 85%, at least about 90%, or at least about 95% of the free functional groups on the surface of the carbon nanotubes.

In embodiments wherein the biological moiety is covalently linked to the surface of the carbon nanotubes, the presence of covalently attached proteins can result in a functionalization charge and an intrinsic positive charge, respectively, which together comprise the net charge on any given individual nanotube or bundle in solution. As a result, high precision separation can be effected because the amount of conjugated biological moiety (e.g., lysozyme) on the carbon nanotubes (e.g., SWCNT) is typically proportional to the length of the carbon nanotubes. In other words, net charge of the carbon nanotubes is proportional to the amount of linked biological moiety (e.g., lysozyme). Accordingly, different length carbon nanotubes (e.g., SWCNT) move with different mobilities in an electrophoretic field. The mobility and velocity of charged CNT fragments depend on the applied electrical field (E, volts/cm) and net charge on the CNT fragments (q) but, inversely on the friction of the molecules, according to the following formula:

$$V = \frac{Eq}{f}$$

where f=frictional coefficient of the mass and shape of the fragment and V=velocity/mobility of the fragment [38]. Smaller (e.g., shorter) CNTs with higher mobility can pass through the gel more easily relative to larger (e.g., longer) nanotubes. In other words, the gel acts like a sieve and retains larger nanotubes while allowing the smaller ones pass through. Therefore, the frictional coefficient is related to how easily a carbon nanotubes fragment passes through the pores of the gel. Indeed, length will be the major determinant of the mobility of SWCNTs in a gel matrix. Substituting length for the frictional coefficient results in: mobility=(voltage)(charge)/(length). In other words, the mobility of a carbon nanotube during gel electrophoresis is primarily a function of its charge/length ratio.

Figure 7:
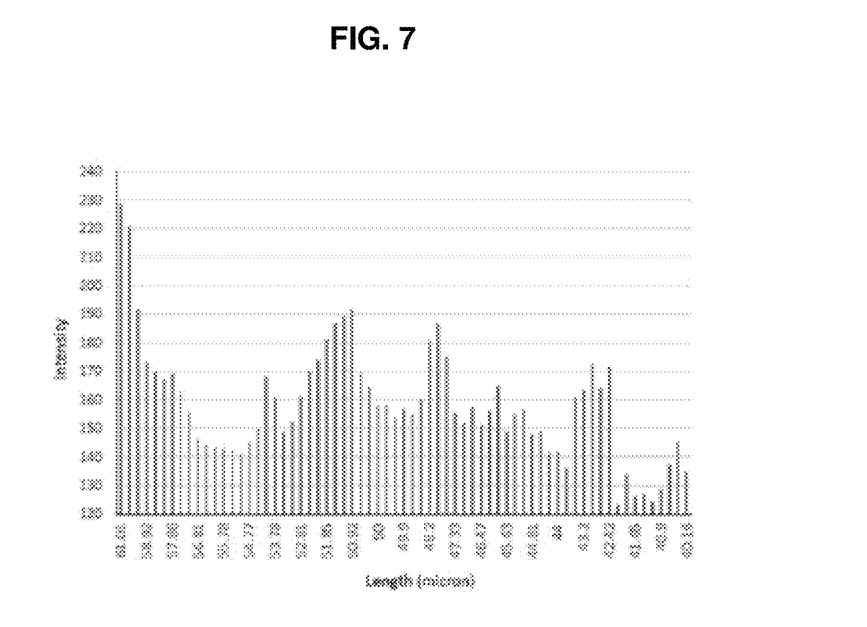
FIG. 7 is a chart showing length distribution of conjugated SWCNTs; visual intensity of the SWCNTs in each lane of the SDS-PAGE gel is plotted versus calculated length of the SWCNTs.

The length distribution of conjugated SWCNTs can be represented by the distribution of the calculated lengths from Usrey's equation versus the visual intensity of the bands of the stained, labelled carbon nanotubes the lanes (FIG. 7). The intensity can be viewed as a measure of the number of CNTs having a specific length on the gel—the higher the visual intensity, the more CNTs with that specific length are present in that group of carbon nanotubes. In FIG. 7, the main distribution of the lengths of CNTs are between 38-50 microns. There is another peak at 60 microns which corresponds to CNTs that remained in or near the loading well.

Methods for Adjusting Carbon Nanotubes Parameters in Manufacturing Processes

In another aspect, the present disclosure provides methods for adjusting the length of carbon nanotubes produced in a carbon nanotube manufacturing process, comprising: obtaining a sample comprising a plurality of carbon nanotubes from the carbon nanotube manufacturing process; labelling each of the plurality of carbon nanotubes with a biological moiety, to provide labelled carbon nanotubes; subjecting the labelled carbon nanotubes to gel electrophoresis, to provide a electrophoresis gel comprising the labelled carbon nanotubes; treating the electrophoresis gel comprising the labelled carbon nanotubes with a visualizing agent to provide stained, labelled carbon nanotubes; measuring the visual intensity of the stained, labelled carbon nanotubes; calculating the length and distribution of the stained, labelled carbon nanotubes; and changing one or more parameters of the carbon nanotube manufacturing process to adjust the length of the carbon nanotubes produced in a carbon nanotube manufacturing process.

Carbon nanotube manufacturing techniques for laboratory or commercial scale production of carbon nanotubes are known in the art. For example, in some embodiments, the carbon nanotube manufacturing process can be arc discharge, laser ablation, chemical vapor deposition (CVD) and high-pressure carbon monoxide disproportionation (HiPCO). In some embodiments, one or more parameters of the carbon nanotube manufacturing process are selected from the group consisting of temperature, pressure, raw material feed rate, beam wavelength, voltage, and current.

One problem in CNT-based nanobiotechnology, nanomedicine, and CNT-based molecular electronics is the lack of length uniformity in mass production of CNTs. In these applications, it is important to separate CNTs based on their length and conductivity.

The present methods can provide a valuable quality control tool for the manufacture of carbon nanotubes of specific lengths in bulk quantities. For example, in some embodiments, the present disclosure provides a method for quality control and parameter adjustment in the production of carbon nanotubes. In some embodiments, the method can include obtaining a sample of a carbon nanotube population from a nanotube manufacturing process, and separating the carbon tubes as described herein. In other embodiments, the method can include determining the length of the sample of a carbon nanotube population from a nanotube manufacturing process and, where the determined length does not fall within a desired range, adjusting one or more parameters of the nanotube manufacturing process.

For purposes of this invention, the chemical elements are identified in accordance with the Periodic Table of the Elements, CAS version, *Handbook of Chemistry and Physics,* 67th ed., 1986-87, inside cover.

It will be understood by one of ordinary skill in the relevant arts that other suitable modifications and adaptations to the compositions and methods described herein are readily apparent from the description of the invention contained herein in view of information known to the ordinarily skilled artisan, and can be made without departing from the scope of the invention or any embodiment thereof.

EXAMPLES

Having now described the present invention in detail, the same will be more clearly understood by reference to the following examples, which are included herewith for purposes of illustration only and are not intended to be limiting.

Materials and Methods

Lyophilized chicken egg white lysozyme (EC 3.2.1.17) was purchased from Inovatech, Inc. (Abbotsford, BC, Canada), and Micrococcus lysodeikticus cells, obtained from Sigma-Aldrich Corporation (St. Louis, Mo.) as salt-free and dry powder, were used without further purification. Carboxyl single-walled carbon nanotubes (SWCNT-COOH) with outer diameters of 1-2 nm were purchased from MKnano, Canada. MES [2-(N-morpholino) ethane sulfonic acid] buffer, N-ethyl-N'-(3-(dimethyl amino) propyl) carbodiimide hydrochloride (EDC), Tris-hydroxymethyl aminomethane (Tris), N,N methylenebisacrylamide (Bis), acrylamide, sodium dodecyl sulfate, ammonium persulfate, tetramethylethylenediamine (TEMED), 2-mercaptoethanol (2ME), 3,3-5,5 tetrabromophenolsulfonphthalein (Bromophenol Blue) and all other chemicals were purchased from Sigma-Aldrich Corporation and used as received.

Example 1—Enzyme Attachment onto SWCNTs

Details of chemically bonding lysozyme to SWCNTs are reported in the literature [41]. Lysozyme conjugation onto SWCNTs was achieved using a carbodiimide [42]. The activated SWCNTs were dispersed in MES buffer, 50 mM, pH 6.2 (1 mg/mL) and added to an equal volume of 400 mM N-hydroxysuccinimide (NHS) in MES buffer. For coupling of NHS to the carboxylic groups on the surface of nanotubes, 20 mM N-ethyl-N'-(3-(dimethylamino) propyl) carbodiimide hydrochloride (EDC) was added to the mixture. The resulting mixture was stirred at 200 rpm for 30 min followed by sonication (MSE Ultrasonic Disintegrators, 150 W, England) for around 30 min. The resulting mixture was centrifuged. The centrifuge steps were repeated three times to remove excess EDC and NHS. The enzyme solution (10 mg/ml, 10 mM phosphate buffer, pH 8) was added to the rinsed nanotubes and sonicated for ca. 1 min to re-disperse the SWCNTs. The mixture was shaken in an orbital shaker at 200 rpm at room temperature during the conjugation process. The conjugated lysozyme-SWCNTs solution was centrifuged and then washed three times with triply distilled water and once with 1% (v/v) Tween-20 to completely remove all nonspecifically adsorbed enzyme. Control enzyme-nanotube conjugates were prepared using the same procedure, only without using EDC and NHS.

Example 2—Conjugated Lysozyme-SWCNTs Characterization

The morphology of conjugated lysozyme-SWCNT was compared with that of activated SWCNTs using time scanning electron microscopy (SEM, S360 Oxford), X-ray diffraction (XRD, D8, Advance, Bruker, axs) at λ=0.1542 nm, and FTIR spectroscopy (Shimadzu FTIR 8300 spectrophotometer) were employed for characterizing conjugated lysozyme-SWCNTs. Conjugated lysozyme-SWCNT samples were sonicated for three time periods of 3, 7 and 10 minutes.

Example 3—SDS-PAGE Electrophoresis and Silver Staining

Acrylamide (29.2 g) and Bis (0.8 g) were dissolved in 100 ml water and then filtered to prepare gel stock solution (30%, m/v). The separating gel solution was prepared by mixing 10.0 ml gel stock solution, 10.0 ml Tris-HCl (1.5 mol L-1, pH 8.80), 200-800 µl (NH4)2S2O8 (10% m/v) and 0.4 g SDS and then diluting with water to 40 mL. To prepare stacking gel, 1.33 ml of the gel stock solution was mixed with 2.5 ml Tris-HCl (0.5 mol L-1, pH 6.80) and 50 µL $(NH_4)_2S_2O_8$ (10%, m/v), and then diluted with water to 10.0 mL. Finally, 10 µL TEMED was added to the mixtures. Before electrophoresis, samples were washed several times with phosphate buffer (10 mM, pH 8) to remove any physically adsorbed enzyme. The electrophoresis buffer was prepared by dissolving Tris (15.14 g), glycine (72.05 g), and SDS (5 g) in 500 ml distilled water. Solution's pH was adjusted to 8.30. A vertical polyacrylamide gel system was used, consisting of separating (10.0% m/v) and stacking (3.0%, m/v) gels. The sample loading volume was 15 µL. The gels were stained with Coomassie Brilliant Blue R-250. Silver staining of gels was achieved through the Blum method [43]. The procedure consists of fixing with methanol, acetic acid and paraformaldehyde solutions, washing with ethanol (50% and 30%) and ddH$_2$O), sensitizing with Na$_2$S$_2$O$_3$.5H$_2$O, washing with ddH$_2$O, impregnating with silver nitrate and paraformaldehyde solution, washing with ddH$_2$O, developing with Na$_2$CO$_3$, paraformaldehyde and Na$_2$S$_2$O$_3$.5H$_2$O solution, washing with ddH$_2$O, and ending reaction with a stop solution-methanol 50%, and acetic acid 12%.

Example 4—Characterization of Conjugated SWCNTs

Figure 1A:
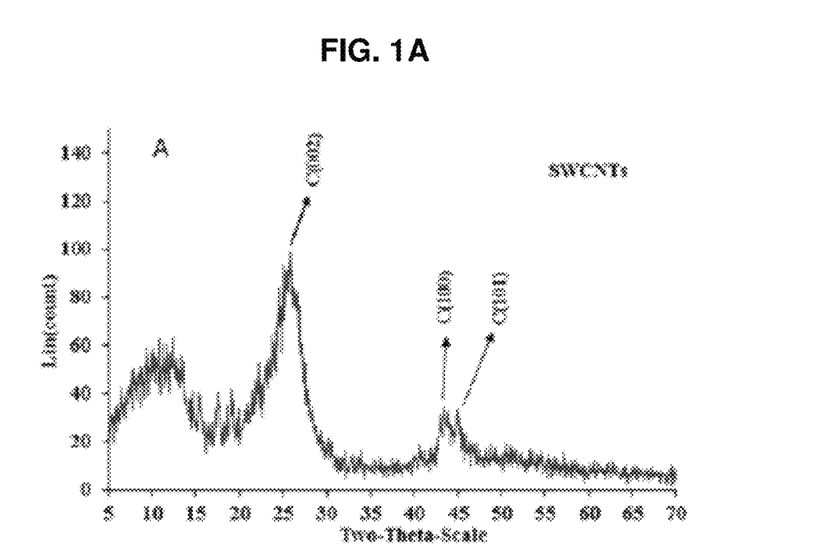
FIG. 1A is a X-ray diffraction (XRD) pattern of SWCNTs.
Figure 1B:
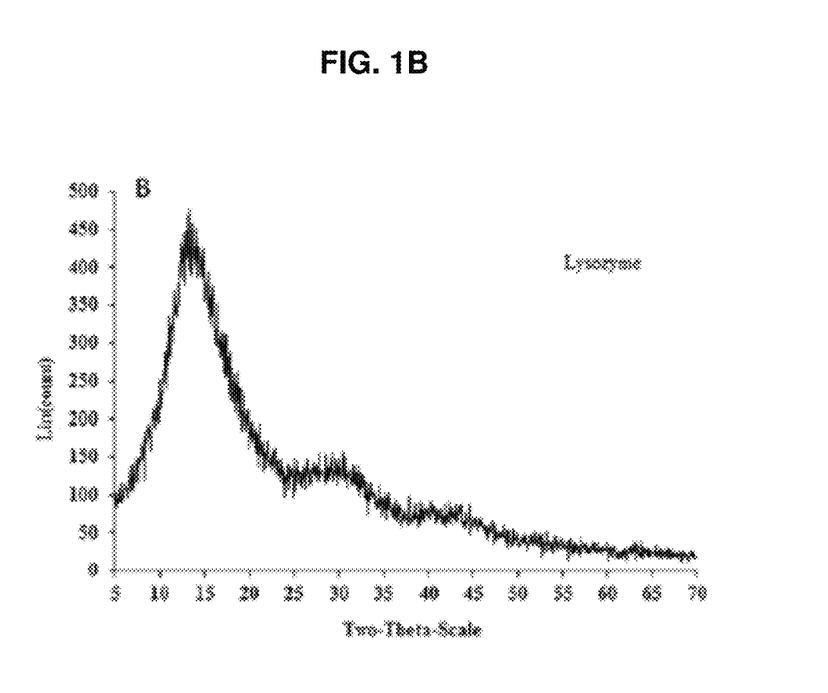
FIG. 1B is a XRD pattern of lysozyme.
Figure 1C:
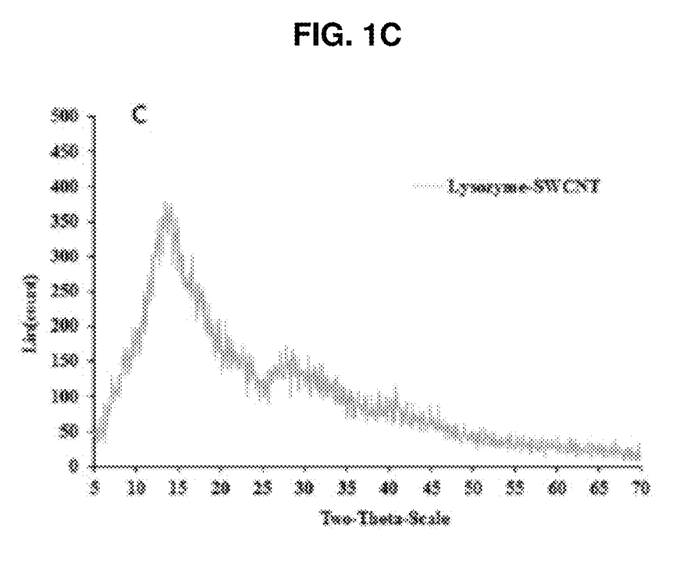
FIG. 1C is a XRD pattern of conjugated lysozyme-SWCNTs.

Bio-conjugation of lysozyme onto nanotubes surface was achieved using carbodiimide. The interactions between free lysozyme and lysozyme-SWCNTs were analyzed using SEM, XRD and FTIR. XRD patterns, as shown in FIGS. 1A, 1B and 1C, confirmed the enzyme attachment onto the surface of oxidized SWCNTs. The strong peaks of the SWCNTs correspond to the (002), (100) and (101) carbon planes. For conjugated lysozyme, the characteristic peaks occur at 2θ of, 14.0, 30.0 and 42.0 which are the same as those for free lysozyme XRD pattern. Indeed, the results showed that there is no significant difference in XRD patterns between the free and conjugated lysozymes, revealing either the adsorption or absorption of lysozyme onto SWCNTs. These results indicate that the conjugation of lysozyme with SWCNTs does not cause a phase change in lysozyme. This suggests that the lysozyme did not have any structural denaturation and retained its activity during the conjugation.

Example 5—Characterization of Conjugation of Lysozyme with SWCNTs by FT-ER

Figure 2:
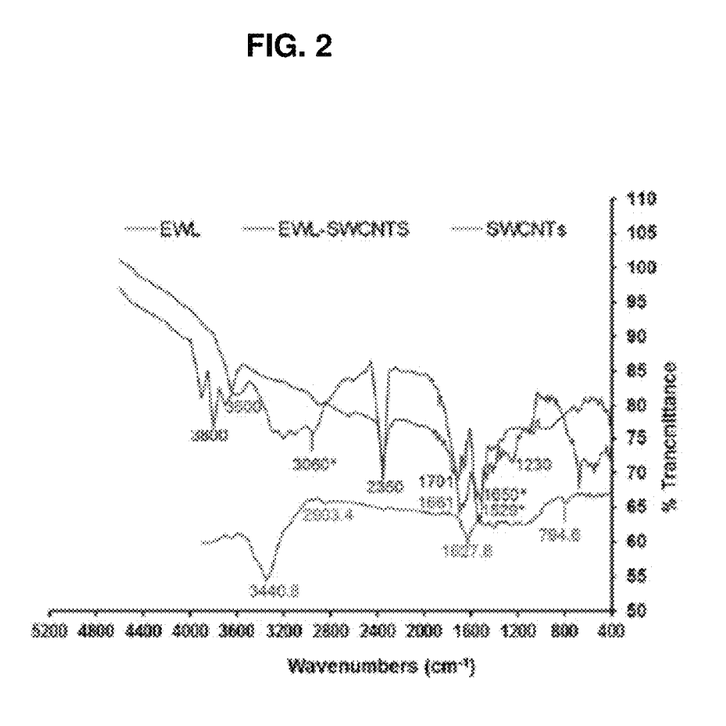
FIG. 2 is FT-IR spectra of free lysozyme, SWCNTs, and conjugated lysozyme-SWCNTs, showing characteristic amide bond peaks in the conjugated lysozyme-SWCNTs.

The mechanism of conjugation of lysozyme to SWCNTs by examined by FTIR analyses. The amide linkages between amino acid residues in polypeptides and proteins result in FTIR fingerprint [35]. The positions of the amide type I and II bands in the FTIR spectra of proteins are indicators of the conformational changes in the protein secondary structure [36] and have been used in studies to investigate immobilized enzyme molecules. FTIR spectra for free lysozyme, the SWCNTs and conjugated lysozyme-SWCNT are shown in FIGS. 2A, 2B and 2C. Activation of SWCNTs was evidenced via formation of —COOH functional groups in the SWCNT matrix according to the absorption peaks, positioned at 1627.8 cm$^{-1}$ and 3440.8 cm$^{-1}$. In lysozyme spectrum, a broad and strong NH$_3$ stretching band in the 2950-2600 cm$^{-1}$ region is the characteristic of amino acids. Overtone region expands the absorption to about 2000 cm$^{-1}$.

These overtone bands usually contain a prominent band near 2222-2000 cm$^{-1}$ assigned to a combination of asymmetrical NH$_3^+$ bending vibration and the torsional oscillation of the NH$_3^+$ group[37]. Besides, a weak asymmetric NH$_3^+$ bending band is observed near 1661 cm$^{-1}$ and a fairly strong symmetric bending band near 1529 cm$^{-1}$. A peak at 3600 cm$^{-1}$ is a representative of the stretching of N—H group and a peak at 1230 cm$^{-1}$ is a representative of the stretching of C—N group in amine groups. In lysozyme-SWCNTs spectrum, the loss of these peaks is an indication of amide bonds formation between amine groups of lysozyme and carboxyl groups of activated SWCNTs. Also, the absorption peak at 1650 cm$^{-1}$ is a sign of the stretching vibration mode of C=O and peaks at 3800 and 1650 cm$^{-1}$ are represents of the stretching of the N—H groups in the amide group. Thus, the FTIR spectrum of lysozyme-SWCNTs, confirmed amide bond formation between amine groups of lysozyme and carboxyl groups of activated SWCNTs.

Example 6—Characterization of Conjugation of Lysozyme with SWCNTs by SEM

Figure 3A:
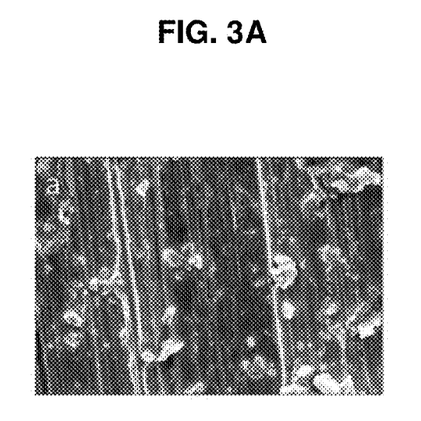
FIG. 3A is a scanning electron microscopy (SEM) image of conjugated lysozyme-SWCNTs at magnification 1.50K, diameter of SWCNT bundle≈592 nm.
Figure 3B:
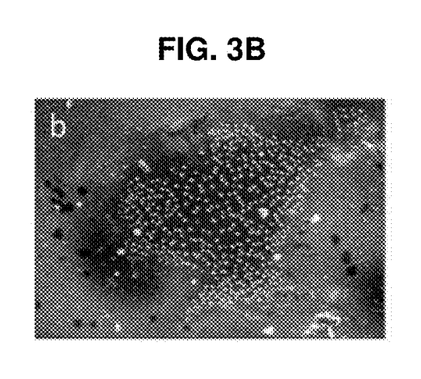
FIG. 3B is a SEM image of conjugated lysozyme-SWCNTs at magnification 10 K.
Figure 3C:
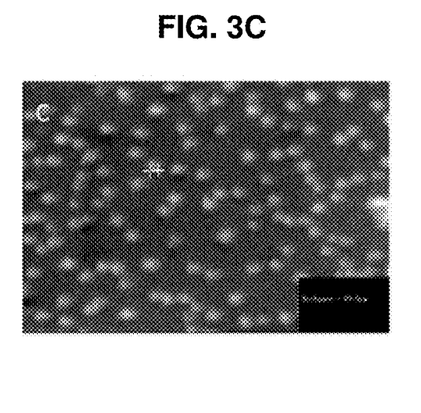
FIG. 3C is a SEM image of conjugated lysozyme-SWCNTs at magnification 30.0K, diameter of conjugated lysozyme-SWCNT≈89.5 nm.

FIGS. 3A, 3B and 3C are SEM images indicating the size and morphology of the conjugated lysozyme-SWCNTs. Increased sidewall thickness of the conjugated lysozyme-SWCNTs to about 89.5-95 nm is an indication of conjugation.

Figure 4A:
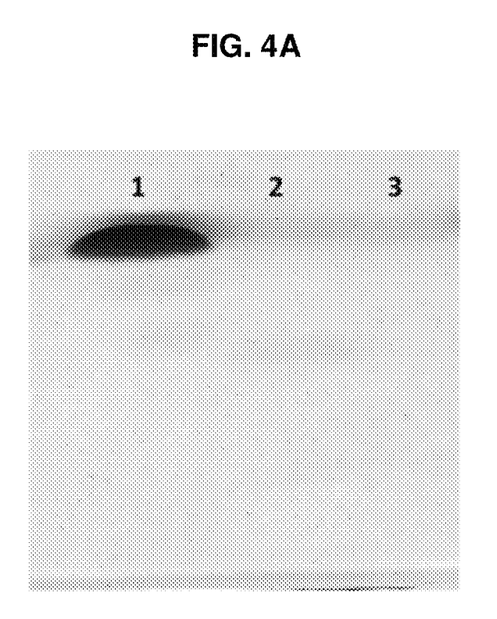
FIG. 4A is a photograph of a SDS-PAGE gel of lysozyme, SWCNTs, and conjugated lysozyme with coomassie blue staining; lane 1 is lysozyme, lane 2 is conjugated lysozyme-SWCNT, lane 3 is SWCNT.
Figure 4B:
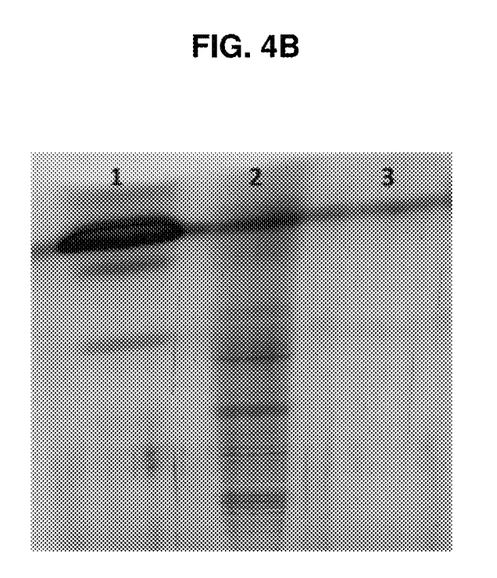
FIG. 4B is a photograph of a SDS-PAGE gel of lysozyme, SWCNTs, and conjugated lysozyme with silver staining; lane 1 is lysozyme, lane 2 is conjugated lysozyme-SWCNT, lane 3 is SWCNT.

Example 7—Length-Dependent Separation of Bio-Conjugated SWCNTs Using SDS-PAGE and Visualization with Silver Staining Because of lysozyme's ability to disperse CNTs, conjugation of lysozyme and CNTs are of particular interest [37]. Based on molecular modelling [38] and experimental studies, lysozyme has the potential to sort nanotubes based on diameter. In this example, conjugation of lysozyme onto carboxyl functionalized carbon nanotubes was employed as a tool to separate carbon nanotubes by length. Selective visualization of nanotube fragments in the acrylamide gel which is a challenge for a number of nanotech researchers, was achieved using silver staining. In contrast to the coomassie blue staining, silver staining showed high resolution CNTs length-based separation of lysozyme-SWCNT fragments. FIG. 4A shows coomassie blue staining and FIG. 4B shows silver staining of free lysozyme (lane 1), conjugated lysozyme-SWCNTs (lane 2), and SWCNTs (lane 3).

The coomassie dyes (R-250 and G-250) are anionic dyes that stoichiometrically bind to proteins through ionic interactions between dye sulfonic acid groups and positive protein amine groups as well as through Van der Waals attractions.

Coomassie blue staining did not show the lysozyme-SWCNTs because of amide bond formation between primary amines of protein and carboxyl groups of SWCNTs, thus there would not be any binding between coomassie blue and lysozyme. In contrast, sharp bands were visualized with silver staining. The sharpness of the bands may be due to the stability of the conjugation, precise proportion of lysozyme molecules based on nanotube lengths and silver staining sensitivity to proteins. Conjugated lysozyme-SWCNT fragments with different lengths had individual mobilities.

Figure 5A:
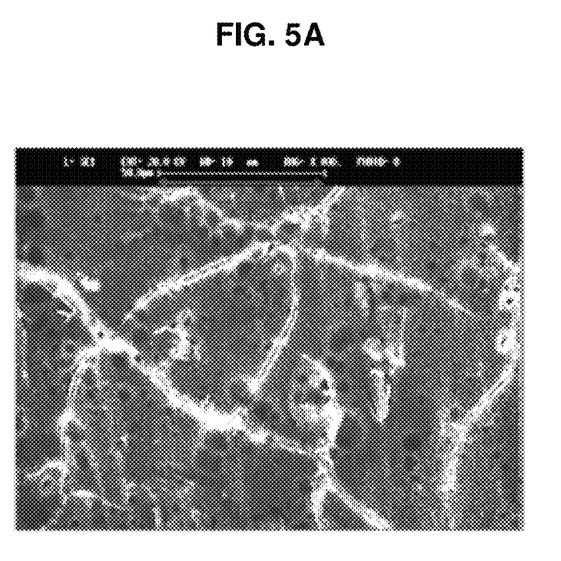
FIG. 5A is a SEM image of conjugated lysozyme-SWCNTs.
Figure 5B:
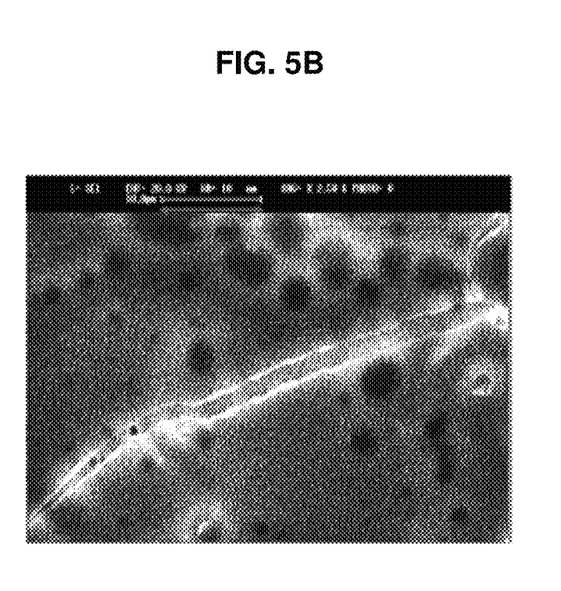
FIG. 5B is a SEM image of conjugated lysozyme-SWCNTs.

Example 8—Length Measurements of Lysozyme-SWCNT Fragments Using Image Analysis Techniques To visualize different degrees of migration of produced lysozyme-SWCNTs into the gel, the bio-conjugated lysozyme-SWCNTs were silver-stained. The migration results are shown in FIGS. 4A and 4B. The corresponding nanotube length of CNTs was calculated from the following theoretical formula [34]:

$$L = d \times \exp([3\pi\mu\eta/(q(d) \times e) - 2 \ln(2) + 1])$$

where d=89.0±0.2 (nm) is the average diameter of each CNT and η=the solvent viscosity=1.25 (Pa·s), μ is the electrophoretic mobility and q(d) is calculated according to Usrey et al. and e is the electron charge [34]. Visual evaluation confirms that the average length of CNTs is between 45-65 microns (FIGS. 5A and 5B).

Figure 6:
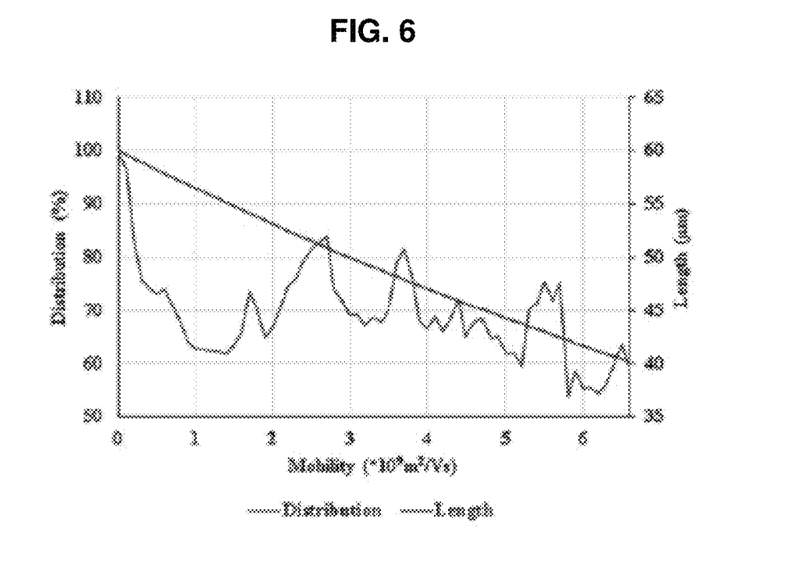
FIG. 6 is a graph showing distribution and lengths of SWCNT fragments.

ImageJ was used to calculate the color intensity in a narrow rectangular region on each lane from the well to the bottom of the gel. This method generated similar results (as shown in FIG. 6) that are in concordance with the visual evaluations. After an analysis of the gel images, experimental data were obtained in the form of mobility distribution (number of nanotubes as a function of mobility). As FIG. 6 shows, SWCNTs of various lengths are present in the population for each experimental electrophoretic mobility value. Image database retrieval was performed based on color intensity.

Thus, the present disclosure provides a combination of bio-conjugation, SDS-PAGE, and staining to separate CNTs based on, e.g., length, to measure a parameter (e.g., length) of the separated nanotubes using electrophoretic mobility values in an electrophoresis (e.g., acrylamide) gel. These methods can provide process quality control and validation in nanotube manufacturing processes.

REFERENCES

1. Baughman R H, Zakhidov A A, de Heer W A. Carbon nanotubes—the route toward applications. science. 2002; 297(5582):787-92.
2. Kong J, Franklin N R, Zhou C, Chapline M G, Peng S, Cho K, et al. Nanotube molecular wires as chemical sensors. science. 2000; 287(5453):622-5.
3. Jones A, Bekkedahl T, Kiang C. Storage of hydrogen in single-walled carbon nanotubes. Nature. 1997; 386:377.
4. Chen P, Wu X, Lin J, Tan K. High H2 uptake by alkali-doped carbon nanotubes under ambient pressure and moderate temperatures. Science. 1999; 285(5424): 91-3.
5. Liu C, Fan Y, Liu M, Cong H, Cheng H, Dresselhaus M S. Hydrogen storage in single-walled carbon nanotubes at room temperature. Science. 1999; 286(5442):1127-9.
6. Bachtold A, Hadley P, Nakanishi T, Dekker C. Logic circuits with carbon nanotube transistors. Science. 2001; 294(5545):1317-20.
7. Yao Z, Postma H W C, Balents L, Dekker C. Carbon nanotube intramolecular junctions. Nature. 1999; 402 (6759):273-6.
8. He H, Pham-Huy L A, Dramou P, Xiao D, Zuo P, Pham-Huy C. Carbon nanotubes: applications in pharmacy and medicine. BioMed research international. 2013; 2013.
9. Wang X, Jiang Q, Xu W, Cai W, Inoue Y, Zhu Y. Effect of carbon nanotube length on thermal, electrical and mechanical properties of CNT/bismaleimide composites. Carbon. 2013; 53:145-52.
10. Franklin A D, Chen Z. Length scaling of carbon nanotube transistors. Nature nanotechnology. 2010; 5(12):858-62.
11. Singh B, Saini K, Choudhary V, Teotia S, Pande S, Saini P, et al. Effect of length of carbon nanotubes on electromagnetic interference shielding and mechanical properties of their reinforced epoxy composites. Journal of nanoparticle research. 2014; 16(1):1-11.
12. Ding Z, Chen J, Gao S, Chang J, Zhang J, Kang E. Immobilization of chitosan onto poly-L-lactic acid film surface by plasma graft polymerization to control the morphology of fibroblast and liver cells. Biomaterials. 2004; 25(6):1059-67.
13. Cheng J, Cheng S H. Influence of carbon nanotube length on toxicity to zebrafish embryos. International journal of nanomedicine. 2012; 7:3731.
14. Sayes C M, Liang F, Hudson J L, Mendez J, Guo W, Beach J M, et al. Functionalization density dependence of single-walled carbon nanotubes cytotoxicity in vitro. Toxicology letters. 2006; 161(2):135-42.
15. Bandow S, Rao A, Williams K, Thess A, Smalley R, Eklund P. Purification of single-wall carbon nanotubes by microfiltration. The Journal of Physical Chemistry B. 1997; 101(44):8839-42.
16. Tohji K, Takahashi H, Shinoda Y, Shimizu N, Jeyadevan B, Matsuoka I, et al. Purification procedure for single-walled nanotubes. The Journal of Physical Chemistry B. 1997; 101(11): 1974-8.
17. Bonard J M, Stora T, Salvetat J P, Maier F, Stöckli T, Duschl C, et al. Purification and size—selection of carbon nanotubes. Advanced Materials. 1997; 9(10):827-31.
18. Dillon A C, Gennett T, Jones K M, Alleman J L, Parilla P A, Heben M J. A simple and complete purification of single-walled carbon nanotube materials. Advanced Materials. 1999; 11(16):1354-8.
19. Li F, Cheng H, Xing Y, Tan P, Su G. Purification of single-walled carbon nanotubes synthesized by the catalytic decomposition of hydrocarbons. Carbon. 2000; 38(14):2041-5.
20. Yudasaka M, Zhang M, Jabs C, Iijima S. Effect of an organic polymer in purification and cutting of single-wall carbon nanotubes. Applied Physics A. 2000; 71(4):449-51.
21. Coleman J N, Dalton A, Curran S, Rubio A, Davey A, Drury A, et al. Phase separation of carbon nanotubes and turbostratic graphite using a functional organic polymer. Advanced materials. 2000; 12(3):213-6.
22. Holzinger M, Hirsch A, Bernier P, Duesberg G, Burghard M. A new purification method for single-wall carbon nanotubes (SWNTs). Applied Physics A. 2000; 70(5):599-602.
23. Niyogi S, Hu H, Hamon M, Bhowmik P, Zhao B, Rozenzhak S, et al. Chromatographic purification of soluble single-walled carbon nanotubes (s-SWNTs). Journal of the American Chemical Society. 2001; 123(4):733-4.
24. Liu J, Rinzler A G, Dai H, Hafner J H, Bradley R K, Boul P J, et al. Fullerene pipes. Science. 1998; 280(5367):1253-6.
25. Duesberg G, Muster J, Krstic V, Burghard M, Roth S. Chromatographic size separation of single-wall carbon nanotubes. Applied Physics A: Materials Science & Processing. 1998; 67(1):117-9.
26. Duesberg G, Blau W, Byrne H, Muster J, Burghard M, Roth S. Chromatography of carbon nanotubes. Synthetic Metals. 1999; 103(1):2484-5.
27. Doorn S K, Fields R E, Hu H, Hamon M A, Haddon R C, Selegue J P, et al. High resolution capillary electrophoresis of carbon nanotubes. Journal of the American Chemical Society. 2002; 124(12): 3169-74.
28. Doorn S K, Strano M S, O'Connell M J, Haroz E H, Rialon K L, Hauge R H, et al. Capillary electrophoresis separations of bundled and individual carbon nanotubes. The Journal of Physical Chemistry B. 2003; 107(25): 6063-9.
29. Yamamoto K, Akita S, Nakayama Y. Orientation and purification of carbon nanotubes using ac electrophoresis. Journal of physics D: Applied physics. 1998; 31(8):L34.
30. Huang W, Taylor S, Fu K, Lin Y, Zhang D, Hanks T W, et al. Attaching proteins to carbon nanotubes via diimide-activated amidation. Nano Letters. 2002; 2(4):311-4.
31. Heller D A, Mayrhofer R M, Baik S, Grinkova Y V, Usrey M L, Strano M S. Concomitant length and diameter separation of single-walled carbon nanotubes. Journal of the American Chemical Society. 2004; 126(44):14567-73.
32. Vetcher A A, Srinivasan S, Vetcher I A, Abramov S M, Kozlov M, Baughman R H, et al. Fractionation of SWNT/nucleic acid complexes by agarose gel electrophoresis. Nanotechnology. 2006; 17(16):4263.
33. Goux-Capes L, Filoramo A, Côte D, Bourgoin J P, Patillon J N. Coupling carbon nanotubes through DNA linker using a biological recognition complex. physica status solidi (a). 2006; 203(6):1132-6.
34. Usrey M L, Nair N, Agnew D E, Pina C F, Strano M S. Controlling the electrophoretic mobility of single-walled carbon nanotubes: A comparison of theory and experiment. Langmuir. 2007; 23(14):7768-76.
35. Dong A, Huang P, Caughey W S. Redox-dependent changes in. beta.-extended chain and turn structures of cytochrome c in water solution determined by second derivative amide I infrared spectra. Biochemistry. 1992; 31(1):182-9.
36. Dong A, Caughey B, Caughey W S, Bhat K S, Coe J E. Secondary structure of the pentraxin female protein in water determined by infrared spectroscopy: Effects of calcium and phosphorylcholine. Biochemistry. 1992; 31(39):9364-70.
37. Silverstein R M, Webster F X, Kiemle D J, Bryce D L. Spectrometric identification of organic compounds: John wiley & sons; 2014.
38. Ziegler K J, Rauwald U, Gu Z, Liang F, Billups W, Hauge R H, et al. Statistically accurate length measurements of single-walled carbon nanotubes. Journal of nanoscience and nanotechnology. 2007; 7(8):2917-21.
39. Asuri P, Bale S S, Pangule R C, Shah D A, Kane R S, Dordick J S. Structure, function, and stability of enzymes covalently attached to single-walled carbon nanotubes. Langmuir. 2007; 23(24):12318-21.
40. Blum H, Beier H, Gross H J. Improved silver staining of plant proteins, RNA and DNA in polyacrylamide gels. Electrophoresis. 1987; 8(2):93-9.
41. Borzooeian Z, Safavi A, Hossain Sheikhi M, Aminlari M, Mandi Doroodmand M. Preparation and investigation on properties of lysozyme chemically bonded to single-walled carbon nanotubes. Journal of Experimental Nanoscience. 2010; 5(6):536-47.
42. Z. Borzooeian M E T, G. Borzooeian, O. Ghasemi, M. Aminlari. Activity and Stability Analysis of Covalent Conjugated Lysozyme-single walled carbon nanotubes: Potential Biomedical and Industrial Applications. RSC Advances. 2017.
43. Raffaini G, Ganazzoli F. Protein adsorption on biomaterial and nanomaterial surfaces: a molecular modeling approach to study non-covalent interactions. Journal of Applied Biomaterial and Biomechanics. 2010; 8(3):135.

What is claimed is:
1. A method for separating carbon nanotubes, comprising: labelling each carbon nanotube of a plurality of carbon nanotubes with at least one peptide fragment having less than 10 amino acids to provide labelled carbon nanotubes, wherein the labelling comprises forming a covalent bond between each carbon nanotube of the plurality of carbon nanotubes and the at least one peptide fragment;

subjecting the labelled carbon nanotubes to gel electrophoresis, to provide an electrophoresis gel comprising the labelled carbon nanotubes;

treating the electrophoresis gel comprising the labelled carbon nanotubes with a visualizing agent to provide a plurality of bands of stained, labelled carbon nanotubes with the visualizing agent to provide a plurality of bands of stained, labelled carbon nanotubes within the gel;

determining at least one length associated with at least one of said plurality of bands of the stained, labelled carbon nanotubes.

2. The method of claim 1, wherein said labelling step comprises reacting any of the plurality of carbon nanotubes and the at least one peptide fragment with a linking reagent to provide the labelled carbon nanotubes.

3. The method of claim 1, wherein gel electrophoresis comprises sodium dodecyl sulfate polyacrylamide gel electrophoresis (SDS-PAGE).

4. The method of claim 1, wherein the visualizing agent comprises silver nitrate or silver-ammonia complex solution.

5. The method of claim 1, wherein the carbon nanotubes are surface functionalized carbon nanotubes.

6. The method of claim 1, wherein subjecting the labelled carbon nanotubes to gel electrophoresis separates the labelled carbon nanotubes into groups of labelled carbon nanotubes.

\* \* \* \* \*